US012503555B2

(12) United States Patent
Ogawa

(10) Patent No.: US 12,503,555 B2
(45) Date of Patent: Dec. 23, 2025

(54) SOLVENTLESS PHOTOCURABLE LIQUID COMPOSITION, CURED PRODUCT THEREOF, OPTICAL FILLER CONTAINING SAME, AND DISPLAY DEVICE INCLUDING LAYER COMPRISING SAID CURED PRODUCT

(71) Applicant: DOW TORAY CO., LTD., Tokyo (JP)

(72) Inventor: Takuya Ogawa, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 713 days.

(21) Appl. No.: 17/800,214

(22) PCT Filed: Feb. 19, 2021

(86) PCT No.: PCT/JP2021/006287
§ 371 (c)(1),
(2) Date: Oct. 27, 2022

(87) PCT Pub. No.: WO2021/167053
PCT Pub. Date: Aug. 26, 2021

(65) Prior Publication Data
US 2023/0107203 A1    Apr. 6, 2023

(30) Foreign Application Priority Data

Feb. 21, 2020 (JP) ................. 2020-028128

(51) Int. Cl.
| C08F 2/46 | (2006.01) |
| C08F 2/50 | (2006.01) |
| C08G 61/04 | (2006.01) |
| C08G 77/00 | (2006.01) |
| C08G 77/20 | (2006.01) |
| G02B 1/04 | (2006.01) |

(52) U.S. Cl.
CPC ............. C08G 77/20 (2013.01); C08G 77/80 (2013.01); G02B 1/04 (2013.01)

(58) Field of Classification Search
CPC .... C08G 59/223; C08G 59/68; C08G 59/306; C08G 65/22; C08G 65/14; C08G 77/20; C08G 77/80; C08G 77/045; C08G 77/14; G02B 1/04; C08L 83/06; C08L 83/04
USPC ............. 522/172, 1, 6, 71, 189, 184; 520/1
See application file for complete search history.

(56) References Cited

U.S. PATENT DOCUMENTS

| 4,234,713 A | 11/1980 | LeGrow |
| 4,359,369 A * | 11/1982 | Takamizawa .......... C08G 77/28 528/30 |
| 4,558,147 A | 12/1985 | Eckberg et al. |
| 2007/0025678 A1 | 2/2007 | Kushibiki et al. |
| 2007/0299165 A1 | 12/2007 | Haitko et al. |
| 2009/0118440 A1 | 5/2009 | Nakanishi et al. |
| 2011/0311788 A1 | 12/2011 | Tagami et al. |
| 2012/0172544 A1 | 7/2012 | Liang et al. |
| 2013/0256741 A1 | 10/2013 | Harkness et al. |
| 2013/0256742 A1 | 10/2013 | Harkness et al. |
| 2014/0008697 A1 | 1/2014 | Harkness et al. |
| 2015/0210905 A1 | 7/2015 | Hoshino et al. |
| 2017/0342198 A1 | 11/2017 | Ogawa et al. |
| 2019/0196331 A1 | 6/2019 | Maruyama et al. |
| 2019/0233692 A1 | 8/2019 | Otomo et al. |
| 2020/0032111 A1 | 1/2020 | Ogawa et al. |
| 2020/0071580 A1 | 3/2020 | Ogawa et al. |
| 2024/0191017 A1* | 6/2024 | Ogawa ................ C08F 290/148 |

FOREIGN PATENT DOCUMENTS

| CA | 1185734 A | 4/1985 |
| CN | 105315675 A | 2/2016 |
| CN | 110291156 A | 9/2019 |
| CN | 110894361 A | 3/2020 |
| EP | 3034535 A1 | 6/2016 |
| JP | 2007008996 A * | 1/2007 ............. C08L 83/04 |
| JP | 2007246894 A | 9/2007 |
| JP | 2008303343 A | 12/2008 |
| JP | 2012001668 A | 1/2012 |
| JP | 2012140617 A | 7/2012 |
| JP | 2013139547 A | 7/2013 |

(Continued)

OTHER PUBLICATIONS

Nakanishi et al, JP 2007008996 Machine Translation, Jan. 18, 2007 (Year: 2007).*
Kashiwagi et al, JP 2016084373 Machine Translation, May 19, 2016 (Year: 2016).*
Machine assisted English translation of CN105315675A obtained from https://worldwide.espacenet.com/patent on Mar. 25, 2024, 27 pages.
Machine assisted English translation of JP2018184574A obtained from https://patents.google.com/patent on Dec. 4, 2022, 11 pages.

(Continued)

*Primary Examiner* — Jessica Whiteley
(74) *Attorney, Agent, or Firm* — Warner Norcross + Judd LLP

(57) ABSTRACT

A photocurable liquid silicone composition, that has low viscosity that facilitates injection into a small gap, cures quickly by irradiating with a high energy beam such as ultraviolet light or the like, has a refractive index after curing that is high not only in a visible region but also in an infrared region, in which composition design is possible to provide an arbitrarily low dielectric constant, and is particularly useful as a material for a device using an infrared LED light source, is provided. The composition comprises: (A) one or more type of an organosilane or organopolysiloxane having on average one or more photoreactive functional groups and two or more monovalent functional groups selected from aromatic groups with 6 to 12 carbon atoms and aralkyl groups with 7 to 12 carbon atoms in a molecule and having 1 to 5 silicon atoms, and optionally further comprising (C) a curing catalyst.

20 Claims, No Drawings

(56) References Cited

FOREIGN PATENT DOCUMENTS

| | | | |
|---|---|---|---|
| JP | 2013256587 A | | 12/2013 |
| JP | 2014205823 A | | 10/2014 |
| JP | 2016003311 A | | 1/2016 |
| JP | 2016084373 A | * | 5/2016 |
| JP | 6150415 B2 | | 6/2017 |
| JP | 2017119848 A | | 7/2017 |
| JP | 2018090806 A | | 6/2018 |
| JP | 2018111792 A | | 7/2018 |
| JP | 2018184574 A | | 11/2018 |
| JP | 2019117325 A | | 7/2019 |
| JP | 2019520438 A | | 7/2019 |
| WO | 2016098305 A1 | | 6/2016 |
| WO | 2016167347 A1 | | 10/2016 |
| WO | 2018066379 A1 | | 4/2018 |
| WO | 2022169556 A1 | | 8/2022 |

OTHER PUBLICATIONS

Machine assisted English translation of JP2014205823A obtained from https://patents.google.com/patent on Dec. 4, 2022, 9 pages.
Machine assisted English translation of JP2016003311A obtained from https://patents.google.com/patent on Dec. 4, 2022, 13 pages.
Machine assisted English translation of JP2013139547A obtained from https://patents.google.com/patent on Dec. 4, 2022, 9 pages.
Machine assisted English translation of JP2013256587A obtained from https://patents.google.com/patent on Dec. 4, 2022, 9 pages.
Machine assisted English translation of JP2017119848A obtained from https://patents.google.com/patent on Dec. 4, 2022, 19 pages.
English translation of International Search Report for PCT/JP2021/006285 dated Apr. 20, 2021, 2 pages.
English translation of International Search Report for PCT/JP2021/006286 dated Apr. 27, 2021, 3 pages.
Machine assisted English translation of JP6150415B2 obtained from <https://patents.google.com/patent> on Aug. 20, 2024, 18 pages.
English translation of International Search Report for PCT/JP2021/006287 dated Apr. 27, 2021, 3 pages.
Machine assisted English translation of WO2016167347A1 obtained from https://patents.google.com/patent on Dec. 4, 2022, 18 pages.
Machine assisted English translation of JP2018111792A obtained from https://patents.google.com/patent on Dec. 4, 2022, 13 pages.
Machine assisted English translation of JP2016084373A obtained from https://patents.google.com/patent on Dec. 4, 2022, 11 pages.
Machine assisted English translation of JP2007246894A obtained from https://patents.google.com/patent on Dec. 4, 2022, 10 pages.
Machine assisted English translation of JP2008303343A obtained from https://patents.google.com/patent on Dec. 4, 2022, 13 pages.
Machine assisted English translation of CN110894361A obtained from https://patents.google.com/patent on Dec. 4, 2022, 11 pages.

* cited by examiner

SOLVENTLESS PHOTOCURABLE LIQUID COMPOSITION, CURED PRODUCT THEREOF, OPTICAL FILLER CONTAINING SAME, AND DISPLAY DEVICE INCLUDING LAYER COMPRISING SAID CURED PRODUCT

CROSS-REFERENCE TO RELATED APPLICATIONS

This application is the U.S. National Stage of International Application No. PCT/JP2021/006287 filed on 19 Feb. 2021, which claims priority to and all advantages of Japanese Patent Application No. 2020-028128 filed on 21 Feb. 2020, the content of which is incorporated herein by reference.

TECHNICAL FIELD

The present invention relates to a solvent-free photocurable liquid composition containing an organosilane or organopolysiloxane that can be cured by actinic rays such as ultraviolet light or an electron beam, and particularly relates to a curable liquid composition that provides a cured product having a high refractive index and a low viscosity that can be preferably used in injection molding, a cured product thereof, and an application thereof. The photocurable curable liquid composition of the present invention is solvent free, has a high refractive index and transparency, and is suitable as a material for forming a light-transmissive layer for electronic and electrical devices and optical devices. Note that the solvent-free photocurable liquid composition can be designed as a material that provides a cured product having an excellent refractive index and transparency and a low dielectric constant.

BACKGROUND ART

A wide range of electronic and electrical devices and optical devices using white and ultraviolet LEDs as light sources have been commercialized. Silicone materials are being actively considered as a peripheral material due to the need for high transparency and reliability. As disclosed in Patent Document 1, for example, liquid silicone compositions with a high refractive index are already in practical use as liquid sealing materials that directly seal a light source. Furthermore, infrared LED light sources and devices using them are also being actively developed in anticipation of large markets for various sensors, monitoring cameras, infrared data communications, and the like. On the other hand, in addition to these conventional LEDs, micro-LED technology, which takes advantage of high energy efficiency thereof, is being rapidly researched and developed, and is beginning to be applied to a variety of applications.

Herein, micro-LEDs and other LEDs that have been under examination in recent years have extremely small light source substrates, which often require peripheral materials to also have a small area and thin layers. In this case, an injection molding method, in which a curable composition is injected into a gap between a light source substrate and a transparent substrate and then cured, is considered promising as a technique for forming a sealing layer therebetween. A low-viscosity liquid silicon material that can be photo-cured and has high transparency after curing is required as a material suitable for this processing method. Furthermore, materials with a high refractive index are desired to reduce interfacial reflections and increase light extraction efficiency.

However, the curable liquid silicone composition disclosed in Patent Document 1 described above is not suitable for the injection molding method because the overall viscosity of the composition at 25° C. is very high at 3,000 mPa·s or higher. More specifically, injection into minute gaps between members (hereinafter, referred to as "small gaps") may not be possible or sufficient gap filling properties may not be achieved when applied to the injection molding method due to the high overall viscosity of the composition. Specifically, even if a curable liquid silicone composition with high viscosity is injected between a light source substrate and a transparent substrate for sealing, injection that can sufficiently fill the gap between the two is difficult, which may cause process defects and sealing failures, resulting in lower production efficiency and yield, lower quality and failure of a final displaying device, which is not preferred.

In contrast, Patent Document 2 discloses a sealing agent for a low-viscosity electronic device containing a silicone compound having a UV reactive group and that can be applied by an inkjet method. Herein, a low molecular weight silicone compound having an epoxy group will be described. Furthermore, Patent Document 3 discloses a low-viscosity UV curable resin composition containing a polyfunctional cationic polymerizable compound, a monofunctional cationic polymerizable compound with a viscosity of 8 mPa·s or less, and a cationic curing catalyst. Herein, a low molecular weight silicone compound having an epoxy group will also be described.

However, these documents do not specifically disclose liquid compositions or cured products thereof having a high refractive index, and specifically, curable liquid compositions and cured products thereof having a refractive index at a wavelength of 847 nm exceeding 1.47, and thus application in materials with a high refractive index is difficult.

Furthermore, Patent Document 4 discloses a pattern-formable photosensitive resin composition containing a double-ended alicyclic epoxy-modified silicone resin and a photoacid generator. Herein, a high refractive index silicone material containing a phenyl group is exemplified, but due to the high degree of polymerization thereof, the composition viscosity is high, and only a composition diluted in an organic solvent is exemplified. However, a solvent-based composition containing an organic solvent uses a large amount of volatile organic solvents in an coating/application process thereof, resulting in deterioration of the work environment and environmental impact. Furthermore, application to an injection molding method is not preferable because an organic solvent may adversely affect an electronic substrate, semiconductor chip, or the like, and the injection volume may change before curing, causing defects and sealing failures in the process. In particular, there is no mention or suggestion in Patent Document 4 regarding a solvent-free photocurable liquid composition and a suitable composition therefor.

RELATED ART DOCUMENTS

Patent Documents

Patent Document 1: Japanese Unexamined Patent Application 2007-008996 (Japanese Patent No. 5392805)
Patent Document 2: WO 2016/167347
Patent Document 3: Japanese Unexamined Patent Application 2018-111792
Patent Document 4: Japanese Unexamined Patent Application 2019-117325

SUMMARY OF THE INVENTION

Problem to be Solved by the Invention

An object of the present invention is to provide: a photocurable liquid composition that has a low viscosity that facilitates injection into a small gap, cures quickly by irradiating with a high energy beam such as ultraviolet light or the like, has a refractive index after curing that is high not only in a visible region but also in an infrared region, and is particularly useful as a material for a device using an infrared LED light source; a cured product thereof; and an application thereof.

Furthermore, the present inventors have discovered a new problem for photocurable liquid compositions in addition to low viscosity (gap filling properties and coatability), curability, transparency, and high refractive index thereof. In recent years, the application development of materials with a high refractive index and high transparency has been expanding, and applications as insulating layers/insulating coating layers that are included in electronic devices and electrical devices are envisioned. However, designing a composition that provides a low dielectric constant such as 2.70 or less, 2.60 or less, or the like is particularly difficult in known photocurable liquid compositions that provide cured products having a high refractive index, and providing a solvent-free photocurable liquid composition that combines low dielectric constant with a high refractive index and that has excellent curability at a low viscosity has not been possible.

Means for Solving the Problem

A photocurable liquid composition of the present invention preferably contains (A) one or more type of an organosilane or organopolysiloxane having on average one or more photoreactive functional groups and two or more monovalent functional groups selected from aromatic groups with 6 to 12 carbon atoms and aralkyl groups with 7 to 12 carbon atoms in a molecule and having 1 to 5 silicon atoms as an essential component, where the viscosity of the entire liquid composition measured at 25° C. using an E-type viscometer is 500 mPa·s or less and an organic solvent is not included in the composition, and further contains a component selected from (C) a curing catalyst, (D) a specific silicon-free photocurable compound, and (E) a photosensitizer.

A cured product of the present invention is obtained by curing the solvent-free photocurable liquid composition described above by irradiating with light.

An optical filler of the present invention contains the solvent-free photocurable liquid composition described above.

A displaying device of the present invention includes a layer containing a cured product obtained by curing the solvent-free photocurable liquid composition described above. In particular, the displaying device is preferably a displaying device that uses an infrared LED light source.

A method of manufacturing a displaying device according to the present invention, includes: a step of injecting the solvent-free photocurable liquid composition described above between a substrate for a light source and a transparent substrate; and a step of curing the solvent-free photocurable liquid composition after injection by irradiating with a high energy beam.

Effects of the Invention

The solvent-free photocurable liquid composition of the present invention has a low viscosity that facilitates injection into a small gap and can cure quickly by irradiating with a high energy beam such as ultraviolet light, without using an organic solvent. Furthermore, the refractive index after curing is high not only in a visible region but also in an infrared region, making it useful as a material for a device using an infrared LED light source.

Furthermore, the solvent-free photocurable liquid composition of the present invention, by combining the component (A) and component (B) described above, can be designed to provide a cured product having a low dielectric constant in addition to the aforementioned properties, and can provide: a solvent-free photocurable liquid composition having both a low dielectric constant and a high refractive index and having low viscosity and excellent curability; and an insulating layer/insulating coating layer included in electronic devices and electrical devices obtained by photocuring the same.

DESCRIPTION OF THE PREFERRED EMBODIMENT

A configuration of the present invention will be further described in detail below.

[Component (A)]

Component (A) of the present invention is one of the characteristic components of the present composition, is a component that is one of the main components of the photocurable liquid composition, reduces the viscosity without impairing the curability of the entire composition, and is a compound that is cured by irradiating with light in the presence of the following component (C), if necessary.

Component (A) is one or more type of an organosilane or organopolysiloxane having on average one or more photoreactive functional groups and two or more monovalent functional groups selected from aromatic groups with 6 to 12 carbon atoms and aralkyl groups with 7 to 12 carbon atoms in a molecule and having 1 to 5 silicon atoms Component (A) has low volatility and does not inhibit the photocuring of the composition of the present invention. Furthermore, component (A) has an aromatic group or aralkyl group in a molecule, and thus is a component that improves the refractive index of the entire composition and a cured product.

Such a component (A) is a silane or siloxane oligomer (organopolysiloxane with a siloxane degree of polymerization of 5 or less) with a small molecular weight because the number of silicon atoms is 5 or less, and has at least one or more organic groups within the molecule that can form bonds between each other by light irradiation, in the presence or absence of a curing catalyst, as photoreactive functional groups, thus providing the composition with photocuring reactivity. On the other hand, component (A) is a component with relatively low molecular weight and low viscosity, while yet having low volatility Therefore, the composition of the present invention containing component (A) exhibits excellent photocuring reactivity, reduces the viscosity of the entire composition and thus is suitable for injection molding, and significantly improves gap filling properties.

Examples of the photoreactive functional group in component (A) can include radical polymerizable groups and cationic polymerizable groups. Radical polymerizable groups are not particularly limited so long as they are a functional group that can form a new bond by a radical reaction mechanism, and particularly a bond between radical polymerizable groups. Examples can include acrylic groups, methacrylic groups, maleimide groups, and organic groups containing any of these groups. Specific examples of the radical polymerizable group include groups such as acryloxypropyl, methacryloxypropyl, acrylamidopropyl, methacrylamidopropyl, 3-(N-maleimido)propyl, and the like.

Examples of cationic polymerizable groups include vinyl ether groups, epoxy group-containing groups, oxetane group-containing groups, and other groups, such as $CH_2=CH-O-(CH_2)_n-$ (where n is an integer from 3 to 20), glycidyloxy $-(CH_2)_n-$ (where n is an integer from 3 to 20), 3,4-epoxycyclohexyl $-(CH_2)_n-$ (where n is an integer from 2 to 20), and the like.

A cationic polymerizable functional group, and particularly one or more type of epoxy group-containing group, is preferred as the photoreactive functional group of component (A). An example of a particularly preferred group includes an epoxycyclohexylalkyl group, and particularly a 3,4-epoxycyclohexylethyl group.

Furthermore, examples of the monovalent functional group selected from aromatic groups with 6 to 12 carbon atoms and aralkyl groups with 7 to 12 carbon atoms include phenyl groups, tolyl groups, xylyl groups, and other aryl groups with 6 to 12 carbon atoms; and benzyl groups, phenethyl groups, and other aralkyl groups with 7 to 12 carbon atoms. Phenyl groups and phenethyl groups are preferred from the perspective of economic efficiency.

On the other hand, examples of other groups bonded to a silicon atom in component (A) (specifically, groups other the photoreactive functional groups and monovalent functional groups selected from the aromatic groups with 6 to 12 carbon atoms, and aralkyl groups with 7 to 12 carbon atoms described above) include methyl groups, ethyl groups, propyl groups, butyl groups, pentyl groups, hexyl groups, heptyl groups, octyl groups, nonyl groups, decyl groups, undecyl groups, dodecyl groups, and other alkyl groups with 1 to 12 carbon atoms; and 3-chloropropyl groups, 3,3,3-trifluoropropyl groups, and other halogen-substituted alkyl groups with 1 to 12 carbon atoms. Methyl groups are preferred from the perspective of economic efficiency and heat resistance. The silicon atom in component (A) may be bonded to a small amount of hydroxyl groups or alkoxy groups such as methoxy groups, ethoxy groups, n-propoxy groups, i-propoxy groups, n-butoxy groups, sec-butoxy groups, tert-butoxy groups and the like.

Component (A) is preferably an organopolysiloxane having 2 to 5 silicon atoms, expressed by the average composition formula (1):

(where $R^X$ represents a photoreactive functional group, $R^Y$ represents a monovalent functional group selected from aromatic groups with 6 to 12 carbon atoms and aralkyl groups with 7 to 12 carbon atoms, and $R^Z$ represents a group selected from unsubstituted or fluorine-substituted monovalent hydrocarbon groups, hydroxyl groups, and alkoxy groups, excluding the photoreactive functional groups and monovalent functional groups selected from the aromatic groups with 6 to 12 carbon atoms, and aralkyl groups with 7 to 12 carbon atoms, and where a, b, and c are numbers that satisfy the following conditions: $1 \leq a+b+c \leq 3$ and $0.08 \leq a/(a+b+c) \leq 0.5$, and one or more $R^X$ and at least two $R^Y$'s are provided in a molecule.).

Herein, $R^X$, $R^Y$, and $R^Z$ are respectively applicable to the aforementioned photoreactive functional groups, and the monovalent functional groups selected from aromatic groups with 6 to 12 carbon atoms and aralkyl groups with 7 to 12 carbon atoms, and a group other than the photoreactive functional groups and monovalent functional groups selected from aromatic groups with 6 to 12 carbon atoms and aralkyl groups with 7 to 12 carbon atoms. Furthermore, component (A) is preferably one or more type of organopolysiloxane having a photoreactive functional group, selected from a group consisting of:

(A1) a chain organopolysiloxane expressed by the following formula (2):

[Formula 1]

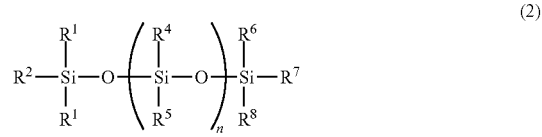

(where on average one or more group per one molecule of all $R^1$ to $R^8$ groups is a photoreactive functional group, and at least two are monovalent functional groups selected from aromatic groups with 6 to 12 carbon atoms and aralkyl groups with 7 to 12 carbon atoms; the other $R^1$ to $R^8$ each independently represent an unsubstituted or fluorine-substituted monovalent hydrocarbon group; and n is a number from 0 to 3);

(A2) a cyclic organopolysiloxane expressed by the following formula (3):

[Formula 2]

(where $R^9$ and $R^{10}$ each independently represent a group selected from photoreactive functional groups, monovalent functional groups selected from aromatic groups with 6 to 12 carbon atoms and aralkyl groups with 7 to 12 carbon atoms, and unsubstituted or fluorine-substituted monovalent hydrocarbon groups, of all $R^9$ and $R^{10}$, an average of one or more group is a photoreactive functional group and at least two are monovalent functional groups selected from aromatic groups with 6 to 12 carbon atoms and aralkyl groups with 7 to 12 carbon atoms, and k is a number from 3 to 5.); and mixtures of these organopolysiloxanes.

Herein, monovalent functional groups selected from aromatic groups with 6 to 12 carbon atoms and aralkyl groups with 7 to 12 carbon atoms as well as groups other than the photoreactive functional groups and monovalent functional groups selected from aromatic groups with 6 to 12 carbon atoms and aralkyl groups with 7 to 12 carbon atoms can be used as the aforementioned group.

The viscosity of the photocurable liquid composition of the present invention can be controlled by adjusting the number of silicon atoms in component (A). The number of silicon atoms is preferably 2 or 3. This is because, if equal to or lower than the upper limit of the aforementioned range, the mechanical strength of the resulting cured product is sufficiently increased. On the other hand, if equal to or higher than the lower limit of the aforementioned range, it is easy to make the photocurable liquid composition have low viscosity.

Furthermore, the hardness of a cured product obtained by curing the photocurable liquid composition of the present invention can be controlled by adjusting the number of photoreactive functional groups in component (A). The number of photoreactive functional groups is preferably between one or more and two or less per molecule on average. This is because, if equal to or lower than the upper limit of the aforementioned range, the photocurability of the resulting curable composition is sufficiently increased. On the other hand, if equal to or higher than the lower limit of the aforementioned range, the toughness of the resulting cured product is improved.

Examples of component (A) include the following compounds A1 to A20.
A1: Diphenyl-bis[2-(3,4-epoxycyclohexyl)ethyl]silane
A2: 1,3-dimethyl-1,3-diphenyl-1,3-bis[2-(3,4-epoxycyclohexyl)ethyl]disiloxane
A3: 1,5-bis[2-(3,4-epoxycyclohexyl)ethyl]-3,3-diphenyl-1,1,5,5-tetramethyltrisiloxane
A4: 1,5-bis[2-(3,4-epoxycyclohexyl)ethyl]-1,5-diphenyl-1,3,3,5-tetramethyltrisiloxane
A5: 1,5-bis[2-(3,4-epoxycyclohexyl)ethyl]-1,3,5-triphenyl-1,3,5-trimethyltrisiloxane
A6: 1,7-bis[2-(3,4-epoxycyclohexyl)ethyl]-3,3-diphenyl-1,1,5,5,7,7-hexamethyltetrasiloxane
A7: 1,7-bis[2-(3,4-epoxycyclohexyl)ethyl]-3,5-diphenyl-1,1,3,5,7,7-hexamethyltetrasiloxane
A8: 1,7-bis[2-(3,4-epoxycyclohexyl)ethyl]-1,7-diphenyl-1,3,3,5,5,7-hexamethyltetrasiloxane
A9: 1,3-bis[2-(3,4-epoxycyclohexyl)ethyl]-5,7-diphenyl-1,3,5,7-tetramethylcyclotetrasiloxane
A10: 1,5-bis[2-(3,4-epoxycyclohexyl)ethyl]-3,7-diphenyl-1,3,5,7-tetramethylcyclotetrasiloxane
A11: 1,3-bis[2-(3,4-epoxycyclohexyl)ethyl]-5,7-diphenethyl-1,3,5,7-tetramethylcyclotetrasiloxane
A12: 1,5-bis[2-(3,4-epoxycyclohexyl)ethyl]-3,7-diphenethyl-1,3,5,7-tetramethylcyclotetrasiloxane
A13: 1-[2-(3,4-epoxycyclohexyl)ethyl]-3,3-diphenyl-5-phenethyl-1,1,5,5-tetramethyltrisiloxane
A14: 1-[2-(3,4-epoxycyclohexyl)ethyl]-1,5-diphenyl-5-phenethyl-1,3,3,5-tetramethyltrisiloxane
A15: 1-[2-(3,4-epoxycyclohexyl)ethyl]-1,3,5-triphenyl-1,3,5-trimethyl-5-phenethyltrisiloxane
A16: 1-[2-(3,4-epoxycyclohexyl)ethyl]-3,3-diphenyl-7-phenethyl-1,1,5,5,7,7-hexamethyltetrasiloxane
A17: 1-[2-(3,4-epoxycyclohexyl)ethyl]-3,5-diphenyl-7-phenethyl-1,1,3,5,7,7-hexamethyltetrasiloxane
A18: 1-[2-(3,4-epoxycyclohexyl)ethyl]-1,7-diphenyl-7-phenethyl-1,3,3,5,5,7-hexamethyltetrasiloxane
A19: 1-[2-(3,4-epoxycyclohexyl)ethyl]-3,5,7-triphenyl-1,3,5,7-tetramethylcyclotetrasiloxane
A20: 1-[2-(3,4-epoxycyclohexyl)ethyl]-3,5,7-triphenethyl-1,3,5,7-tetramethylcyclotetrasiloxane The amount of component (A) is preferably 10 to 99.9 parts by mass, more preferably 15 to 99.5 parts by mass, and even more preferably 25 to 99 parts by mass, relative to 100 parts by mass of the photocurable liquid composition containing component (A). This is because, if the amount of component (A) is equal to or higher than the lower limit of the aforementioned range, the mechanical properties of the resulting cured product will be enhanced. On the other hand, if the amount is equal to or lower than the upper limit of the aforementioned range, the photocurablility of the resulting curable composition is sufficiently high.

When component (B) to be described later is optionally used, the amount of component (A) is such that the sum of component (A) and component (B) is preferably 90 to 99.9 parts by mass, more preferably 95 to 99.5 parts by mass, and even more preferably 98 to 99.5 parts by mass, relative to 100 parts by mass of the entire photocurable liquid composition, and the mass ratio of component (A) to component (B) can be selected to be within a range of 100:0 to 10:90, within a range of 100:0 to 15:85, or within a range of 100:0 to 20:80. Herein, when a composition is designed to provide a cured product having a dielectric constant of 2.70 or less, and particularly 2.60 or less by a photocuring reaction, the mass ratio of component (A) to component (B) of the solvent-free photocurable liquid composition of the present invention is preferably within a range of 80:20 to 20:80, and more preferably within a range of 70:30 to 30:70.

[Component (C)]

Component (C) of the present invention is a curing catalyst that cures the photocurable liquid composition, based on the type of light/high energy beam used for curing and as needed. In this case, when the photoreactive functional group provided by component (A) is a cationic polymerizable functional group containing epoxy, vinyl ether, or the like, a photocationic polymerization initiator (C1) is used as the curing catalyst. Well known photocationic polymerization initiators include compounds that can generate Bronsted acids or Lewis acids by light or electron beam irradiation, and are so-called photoacid generators, and it is known that irradiation of light or the like generates an acid, which causes a reaction between cationic polymerizable functional groups. Furthermore, when the photoreactive functional group is a radical polymerizable functional group, a photoradical polymerization initiator (C2) can be used as a curing catalyst. The photoradical polymerization initiator generates free radicals by irradiating ultraviolet rays or electron beams, which trigger a radical polymerization reaction, to cure the composition of the present invention. When the composition of the present invention is cured by electron beam irradiation, these polymerization initiators are normally not required, and a curing reaction proceeds even without component (C).

For practical use, the photoreactive functional group in component (A) is preferably an epoxy group-containing group, and in this case, it is preferable to include one or more type of the curing catalyst (C) selected from (C1) photocationic polymerization initiators and (C2) photoradical polymerization initiators.

(C1) Photocationic Polymerization Initiator

The photocationic polymerization initiator used in the composition of the present invention can be selected from any known in the technical field and is not limited to any particular one. Strong acid generating compounds, such as diazonium salts, sulfonium salts, iodonium salts, phosphonium salts, and the like, are known as photocationic polymerization initiators, and these can be used. Examples of photocationic polymerization initiators include, but are not limited to, bis(4-tert-butylphenyl)iodonium hexafluorophosphate, cyclopropyldiphenylsulfonium tetrafluoroborate, dimethylphenacylsulfonium tetrafluoroborate, diphenyliodonium hexafluorophosphate, diphenyliodonium hexafluoroarsenate, diphenyliodonium tetrafluoromethanesulfonate, 2-(3,4-dimethoxystyryl)-4,6-bis(trichloromethyl)-1,3,5-triazine, 242-[2-(furan-2-yl)vinyl]-4,6-bis(trichloromethyl)-1,3,5-triazine, 4-isopropyl-4'-methyldiphenyliodonium tetrakis(pentafluorophenyl)borate, 2-[2-(5-methylfuran-2-yl)vinyl]-4,6-bis(trichloromethyl)-1,3,5-triazine, 2-(4-methoxyphenyl)-4,6-bis(trichloromethyl)-1,3,5-triazine, 2-(4-methoxystylyl)-4,6-bis(trichloromethyl)-1,3,5-triazine, 4-nitrobenzenediazonium tetrafluoroborate, triphenylsulfonium tetrafluoroborate, triphenylsulfonium bromide, tri-p-tolylsulfonium hexafluorophosphate, tri-p-tolylsulfonium trifluoromethanesulfonate, diphenyliodonium triflate, triphenylsulfonium triflate, diphenyliodonium nitrate, bis(4-tert-butylphenyl)iodonium perfluoro-1-butane sulfonate, bis(4-tert-butylphenyl)iodonium triflate, triphenylsulfonium perfluoro-1-butanesulfonate, N-hydroxynaphthalimide triflate, p-toluene sulfonate, diphenyliodonium p-toluenesulfonate, (4-tert-butylphenyl) diphenylsulfonium triflate, tris(4-tert-butylphenyl)sulfonium triflate, N-hydroxy-5-norbornene-2,3-dicarboxymide perfluoro-1-butanesulfonate, (4-phenylthiophenyl) diphenylsulfonium triflate, 4-(phenylthio) phenyldiphenylsulfonium triethyltrifluorophosphate, and the like. In addition to the compounds above, examples of photocationic polymerization initiators can include Omnicat 250, Omnicat 270 (above, IGM Resins B. V.), CPI-310B, IK-1 (above, San-Apro Ltd.), DTS-200 (Midori Kagaku Co., Ltd.), and Irgacure 290 (BASF), and other commercially available photoinitiators.

The amount of the photocationic polymerization initiator added to the composition of the present invention is not particularly limited so long as a desired photo-curing reaction occurs, but in general, the photocationic polymerization initiator is preferably used at an amount of 0.1 to 10 mass %, and particularly preferably 0.5 to 5 mass % or 1 to 2 mass % relative to the total amount of component (A) and component (B) to be described later of the present invention.
(C2) Photoradical Polymerization Initiator
The photoradical polymerization initiators are known to be broadly classified into photofragmentation and hydrogen abstraction types. The photoradical polymerization initiator used in the composition of the present invention can be selected arbitrarily from those known in the technical field, and is not limited to any particular one. Examples of photoradical polymerization initiators include, but are not limited to, acetophenone, p-anisyl, benzyl, benzoin, benzophenone, 2-benzoylbenzoic acid, 4,4'-bis(diethylamino)benzophenone, 4,4'-bis(dimethylamino) benzophenone, benzoin methyl ether, benzoin isopropyl ether, benzoin isobutyl ether, benzoin ethyl ether, 4-benzoylbenzoic acid, 2,2'-bis(2-chlorophenyl)-4,4',5,5'-tetraphenyl-1,2'-biimidazole, methyl 2-benzoylbenzoate, 2-(1,3-benzodioxol-5-yl)-4,6-bis(trichloromethyl)-1,3,5-triazine, 2-benzyl-2-(dimethylamino)-4'-morpholinobutyrophenone, (±)-camphorquinone, 4,4'-dichlorobenzophenone, 2,2-diethoxyacetophenone, 2,2-dimethoxy phenylacetophenone, 2,4-diethylthioxanthene-9-one, diphenyl(2,4,6-trimethylbenzoyl)phosphine oxide, ethyl(2,4,6-trimethylbenzoyl)phenyl phosphinate, 1,4-dibenzoylbenzene, 2-ethylanthraquinone, 1-hydroxycyclohexylphenyl ketone, 2-hydroxy-2-methylpropiophenone, 2-hydroxy-4'-(2-hydroxyethoxy)-2-methylpropiophenone, lithium phenyl(2,4,6-trimethylbenzoyl)phosphinate, 2-methyl-4'-(methylthio)-2-morpholinopropiophenone, 2-isonitrosopropiophenone, 2-phenyl-2-(p-toluenesulfonyloxy)acetophenone, and phenylbis(2,4,6-trimethylbenzoyl) phosphine oxide, and the like. Furthermore, in addition to the compounds above, examples of the photoradical polymerization initiators can include Omnirad 651, 184, 1173, 2959, 127, 907, 369, 369E, and 379EG (alkylphenone photoradical polymerization initiator, IGM Resins B.V.), Omnirad TPO H, TPO-L, and 819 (acyl phosphine oxide photoinitiators, IGM Resins B.V.), Omnirad MBF and 754 (intramolecular hydrogen extraction type photoinitiators, IGM Resins B.V.), Irgacure OXE01 and OXE02 (oxime ester non-associative polymerization initiator, BASF), and the like.

While the amount of the photoradical polymerization initiator added to the composition of the present invention is not particularly limited so long as the intended photoradical polymerization reaction or photo-curing reaction occurs, it is generally used at an amount of 0.01 to 5 mass %, and preferably 0.05 to 1 mass % relative to the total mass of the composition of the present invention.
[(E) Photosensitizer]
Moreover, a photosensitizer may be used in combination with the photocationic polymerization initiator or the photoradical polymerization initiator. Use of a photosensitizer can increase the photon efficiency of the polymerization reaction, and is particularly effective when the coating thickness of the composition is relatively thick or when a relatively long-wavelength LED light source is used, because use of longer wavelength light for the polymerization reaction compared to only using a photoinitiator is feasible. For practical use, the solvent-free photocurable liquid composition according to the present invention preferably further contains one or more type of a photosensitizer (E) in addition to component (C) described above, which can improve the photocuring reactivity of the entire composition.

A conventionally known component can be used as the photosensitizer without particular limitation. Known examples thereof include, but are not limited to, anthracene based compounds, phenothiazine based compounds, perylene based compounds, cyanine based compounds, melocyanine based compounds, coumarin based compounds, benzylidene ketone based compounds, and (thio)xanthene or (thio)xanthone based compounds such as 2-chlorothiaxanthone, 2-isopropylthioxanthone, 2,4-diethylthioxanthone, squarylium based compounds, (thia)pyrylium based compounds, porphyrin based compounds, and the like, and an arbitrary photosensitizer can be used in the curable composition of the present invention. As an example, in the composition of the present invention, when the photoreactive functional group in component (A) described above is an epoxy-containing group and a photocationic polymerization initiator (C1) is used, a 2-isopropylthioxanthone or other thioxanthone, which is a triplet photosensitizer, can be preferably used.
[Component (B)]
The solvent-free photocurable liquid composition of the present invention can contain, as an optional component, (B) one or more type of organopolysiloxane having on average one or more photoreactive functional group in a molecule and having 2 to 10 silicon atoms (however, excluding the organopolysiloxane corresponding to component (A) described above).

Specifically, component (B) can be distinguished from component (A) in terms of the presence or absence of aromatic groups and aralkyl groups and the number of silicon atoms thereof. In other words, component (B) is one or more type selected from:
(B1) one or more type of an organopolysiloxane having on average one or more photoreactive functional groups in a molecule, in which the included number of monovalent functional groups selected from aromatic groups with 6 to 12 carbon atoms and aralkyl groups with 7 to 12 carbon atoms is less than two, and having 2 to 5 silicon atom atoms; and
(B2) one or more type of organopolysiloxane having on average one or more photoreactive functional groups in a molecule and having over 5 and 10 or less silicon atoms.

Such a component (B) is a linear, branched, or cyclic organopolysiloxane having 2 to 10 silicon atoms, expressed by the following average composition formula (4)

  (4)

(where $R^X$ represents a photoreactive functional group, $R^Y$ represents a monovalent functional group selected from aromatic groups with 6 to 12 carbon atoms and aralkyl groups with 7 to 12 carbon atoms, and $R^Z$ represents a group selected from unsubstituted or fluorine-substituted monovalent hydrocarbon groups, hydroxyl groups, and alkoxy groups, excluding the photoreactive functional groups and monovalent functional groups selected from the aromatic groups with 6 to 12 carbon atoms, and aralkyl groups with 7 to 12 carbon atoms, and where d, e, and f are numbers that satisfy the following conditions: $1 \leq d+e+f \leq 3$ and $0.04 \leq d/(d+e+f) \leq 0.5$, and one or more $R^X$ and less than two $R^Y$s are provided in a molecule.),
and does not correspond to component (A).

$R^X$, $R^Y$, and $R^Z$ in component (B) are respectively applicable to the aforementioned photoreactive functional groups and the monovalent functional groups selected from aromatic groups with 6 to 12 carbon atoms and aralkyl groups with 7 to 12 carbon atoms, and a group other the photoreactive functional groups and monovalent functional groups selected from aromatic groups with 6 to 12 carbon atoms and aralkyl groups with 7 to 12 carbon atoms.

The photoreactive functional group of component (B) is preferably a cationic polymerizable functional group, and particularly one or more type of epoxy group-containing group. An example of a particularly preferred group includes an epoxycyclohexylalkyl group, and particularly a 3,4-epoxycyclohexylethyl group.

Examples of component (B) include the following compounds B1 to B21.

B1: 1-[2-(3,4-(epoxycyclohexyl)ethyl]-1,1,3,3,3-pentamethyldisiloxane
B2: 1,3-bis[2-(3,4-epoxycyclohexyl)ethyl]-1,1,3,3-tetramethyldisiloxane
B3: 1-[2-(3,4-(epoxycyclohexyl)ethyl]-3-phenethyl-1,1,3,3,3-tetramethyldisiloxane
B4: 3-[2-(3,4-epoxycyclohexyl)ethyl]-1,1,1,3,5,5,5-heptamethyltrisiloxane
B5: 1,5-bis[2-(3,4-epoxycyclohexyl)ethyl]-1,1,3,3,5,5-hexamethyltrisiloxane
B6: 1,3,5-tris[2-(3,4-epoxycyclohexyl)ethyl]-1,1,3,5,5-pentamethyltrisiloxane
B7: 1,5-bis[2-(3,4-epoxycyclohexyl)ethyl]-3-phenyl-1,1,3,5,5-pentamethyltrisiloxane
B8: 1-[2-(3,4-(epoxycyclohexyl)ethyl]-5-phenethyl-1,1,3,3,5,5-hexamethyltrisiloxane
B9: 1,7-bis[2-(3,4-epoxycyclohexyl)ethyl]-1,1,3,3,5,5,7,7-octamethyltetrasiloxane
B10: 1,7-bis[2-(3,4-epoxycyclohexyl)ethyl]-3-phenyl-1,1,3,5,5,7,7-heptamethyltetrasiloxane
B11: 3-[2-(3,4-epoxycyclohexyl)ethyl]-1,1,1,3,5,5,7,7,7-nonamethyltetrasiloxane
B12: 3,5-bis[2-(3,4-epoxycyclohexyl)ethyl]-1,1,1,3,5,7,7,7-octamethyltetrasiloxane
B13: 1-[2-(3,4-epoxycyclohexyl)ethyl]-7-phenethyl-1,1,3,3,5,5,7,7-octamethyltetrasiloxane
B14: 3-[2-(3,4-epoxycyclohexyl)ethyl]-5-phenethyl-1,1,1,3,5,7,7,7-octamethyltetrasiloxane
B15: 1-[2-(3,4-epoxycyclohexyl)ethyl]-1,3,3,5,5,7,7-heptamethylcyclotetrasiloxane
B16: 1,3-bis[2-(3,4-epoxycyclohexyl)ethyl]-1,3,5,5,7,7-hexamethylcyclotetrasiloxane
B17: 1,5-bis[2-(3,4-epoxycyclohexyl)ethyl]-1,3,3,5,7,7-hexamethylcyclotetrasiloxane
B18: 1,3,5-tris[2-(3,4-epoxycyclohexyl)ethyl]-7-phenyl-1,3,5,7-tetramethylcyclotetrasiloxane
B19: 1,3,5-tris[2-(3,4-epoxycyclohexyl)ethyl]-1,3,5,7,7-pentamethylcyclotetrasiloxane
B20: 1,3,5,7-tetrakis[2-(3,4-epoxycyclohexyl)ethyl]-1,3,5,7-tetramethylcyclotetrasiloxane
B21: 1,3,5-tris[2-(3,4-epoxycyclohexyl)ethyl]-7-phenethyl-1,3,5,7-tetramethylcyclotetrasiloxane In the photocurable liquid composition of the present invention, the inclusion of component (B) can increase the degree of freedom for designing the mechanical strength including hardness, tensile strength, elongation at break, and the like, curing reaction rate, refractive index, and the like of the cured product obtained by curing the photocurable liquid composition in a desired range. Furthermore, by using component (A) and component (B) together, the dielectric constant of the cured product obtained by curing the photocurable liquid composition can be preferably designed to be 2.70 or less, and preferably 2.60 or less.

Although the amount thereof is not limited, when the entire photocurable liquid composition is 100 parts by mass, the sum of the component (A) and component (B) is preferably 90 to 99.9 parts by mass, and the mass ratio of component (A) to component (B) is selected to be within a range of 100:0 to 10:90. When the composition is designed to provide a cured product having a dielectric constant of 2.70 or less, and particularly 2.60 or less, the mass ratio of component (A) to component (B) is preferably within a range of 80:20 to 20:80. Note that the amount of component (B) alone is preferably within a range of 0 to 80 parts by mass, and more preferably within a range of 0 to 70 parts by mass or 0 to 55 parts by mass.

The viscosity of the photocurable liquid composition of the present invention is a value measured using an E-type viscometer at 25° C. of 500 mPa·s or less. This is because within this range, injection molding of the resulting composition is possible. A range of 5 to 250 mPa·s, a range of 5 to 200 mPa·s, or a range of 5 to 100 mPa·s is preferable. This is because if the viscosity of the present composition is at or above the lower limit of the range above, the mechanical properties of the cured product obtained will be favorable. On the other hand, if the viscosity is at or below the upper limit of the range above, the injection moldability of the obtained composition will be favorable.

The refractive index of the photocurable liquid composition of the present invention is preferably a value at 25° C. and a wavelength of 847 nm that is 1.46 or higher but may be 1.47 or higher, 1.49 or higher, and 1.50 or higher, or may be within a range of 1.46 to 1.54 or within a range of 1.46 to 1.53. This property allows the refractive index of a cured product obtained by curing the present composition to be sufficiently high to reduce interfacial reflection between optical glass and another light-transmissive layers in various devices using an infrared LED as a light source, thereby improving light extraction efficiency. Note that the refractive index of the cured product will be described later.

[Component (D)]

The photocurable liquid composition of the present invention can contain (D) a photocurable compound that does not contain a silicon atom, expressed by the formula: $R^X$—R, to the extent that the object of the present invention is not impaired. Herein, $R^X$ represents a photoreactive functional group described above, and while a radical polymerizable functional group and cationic polymerizable functional group are applicable, a cationic polymerizable functional group, and particularly one or more type of epoxy group-containing group is preferable. Particularly preferred groups include glycidyl groups and epoxycyclohexylalkyl groups. On the other hand, R represents a monovalent functional group selected from unsubstituted or fluorine-substituted monovalent alkyl groups, alkenyl groups with 2 to 6 carbon atoms, aromatic groups with 6 to 12 carbon atoms, aralkyl groups with 7 to 12 carbon atoms, hydroxyl groups, and alkoxy groups.

Examples of such compounds include allyl glycidyl ether, benzyl glycidyl ether, 2,2-bis(4-glycidoxyphenyl)propane, 1,4-butanediol-diglycidyl ether, butyl glycidyl ether, tert-butyl glycidyl ether, 4-tert-butylphenyl-glycidyl ether, glycidyl isopropyl ether, glycidyl phenyl ether, diglycidyl-1,2-cyclohexanedicarboxylate, ethylene glycol diglycidyl ether, neopentyl glycol diglycidyl ether, 2-ethylhexyl glycidyl ether, glycidyl acrylate, glycidyl methacrylate, and other glycidyl ethers; glycidyl esters; and 3,4-epoxycyclohexylmethyl acrylate, 1,2-epoxy-4-vinylcyclohexane, 3',4'-epoxycyclohexylmethyl-3,4-epoxycyclohexanecarboxylate, 3,3'-di-7-oxabicyclo[4,1,0]heptane, and other epoxycyclohexyl group-containing compounds.

Other Additives

In addition to the aforementioned components, an additional additive may be added to the composition of the present invention if desired. Examples of additives include, but are not limited to, those described below.

[Adhesion Imparting Agent]

An adhesion promoter can be added to the composition of the present invention to improve adhesion and close fitting properties to a substrate in contact with the composition. When the curable composition of the present invention is used for applications such as coating agents, sealing materials, and the like that require adhesion or close fitting properties to a substrate, an adhesion imparting agent is preferably added to the curable composition of the present invention. An arbitrary known adhesion promoter can be used, so long as the adhesion promoter does not interfere with a curing reaction of the composition of the present invention.

Examples of such adhesion promoters that can be used in the present invention include: organosilanes having a trialkoxysiloxy group (such as a trimethoxysiloxy group or a triethoxysiloxy group) or a trialkoxysilylalkyl group (such as a trimethoxysilylethyl group or triethoxysilylethyl groups) and a hydrosilyl group or an alkenyl group (such as a vinyl group or an allyl group), or organosiloxane oligomers having a linear structure, branched structure, or cyclic structure with approximately 4 to 20 silicon atoms; organosilanes having a trialkoxysiloxy group or a trialkoxysilylalkyl group and a methacryloxyalkyl group (such as a 3-methacryloxypropyl group), or organosiloxane oligomers having a linear structure, branched structure, or cyclic structure with approximately 4 to 20 silicon atoms; organosilanes having a trialkoxysiloxy group or a trialkoxysilylalkyl group and an epoxy group-bonded alkyl group (such as a 3-glycidoxypropyl group, a 4-glycidoxybutyl group, a 2-(3,4-epoxycyclohexyl)ethyl group, or a 3-(3,4-epoxycyclohexyl)propyl group), or organosiloxane oligomers having a linear structure, branched structure, or cyclic structure with approximately 4 to 20 silicon atoms; organic compounds having two or more trialkoxysilyl groups (such as trimethylsilyl groups or triethoxysilyl groups); reaction products of aminoalkyltrialkoxysilane and epoxy group-bonded alkyltrialkoxysilane, and epoxide group-containing ethyl polysilicate. Specific examples thereof include vinyl trimethoxysilane, allyl trimethoxysilane, allyl triethoxysilane, hydrogen triethoxysilane, 3-glycidoxypropyl trimethoxysilane, 3-glycidoxypropyl triethoxysilane, 2-(3,4-epoxycyclohexyl)ethyl trimethoxysilane, 3-methacryloxypropyl trimethoxysilane, 3-methacryloxypropyl triethoxysilane, 1,6-bis(trimethoxysilyl)hexane, 1,6-bis(triethoxysilyl) hexane, 1,3-bis[2-(trimethoxysilyl)ethyl]-1,1,3,3-tetramethyldisiloxane, reaction products of 3-glycidoxypropyl triethoxysilane and 3-aminopropyl triethoxysilane, condensation reaction products of a methylvinyl siloxane oligomer blocked with a silanol group and a 3-glycidoxypropyl trimethoxysilane, condensation reaction products of a methylvinyl siloxane oligomer blocked with a silanol group and a 3-methacryloxypropyl triethoxysilane, and tris(3-trimethoxysilylpropyl)isocyanurate.

The amount of the adhesion promoter to be added to the curable composition of the present invention is not particularly limited. However, since it does not promote curing properties of the curable composition or discoloration of a cured product, the amount is preferably within a range of 0 to 5 parts by mass, or within a range of 0 to 2 parts by mass, relative to a total of 100 parts by mass of components (A) and (C).

[Other Additives]

Another additive may be added to the composition of the present invention in addition to or in place of the adhesion imparting agent described above, if desired. Examples of additives that can be used include leveling agents, silane coupling agents not included in those listed above as adhesion imparting agents, UV absorbers, antioxidants, polymerization inhibitors, fillers (reinforcing fillers, insulating fillers, thermal conductive fillers, and other functional fillers), and the like. If necessary, an appropriate additive can be added to the composition of the present invention. Furthermore, a thixotropy imparting agent may also be added to the composition of the present invention if necessary, particularly when used as a potting agent or sealing agent.

The present composition can be prepared by uniformly mixing component (A), component (C), with component (B) added as needed, along with other arbitrary components. When preparing the present composition, mixing can be performed at room temperature using various types of stirrers or kneaders, and if necessary, mixing can be performed while heating. Furthermore, the order of combining the various components is not restricted, and mixing can be performed in any order. On the other hand, preparation of the present composition is recommended to be in a location where there is no contamination of light at or below 450 nm or in a location with as little of the light described above as possible to avoid the effect on curing during preparation.

The present composition can be cured by light irradiation. Examples of the light used for curing the present composition include ultraviolet light, electron beams and other high energy beams, and visible light, but the wavelength of the light beam is preferably within a range of 250 to 450 nm. Irradiation with a high energy beam using ultraviolet light with a wavelength of 400 nm or less is more preferable. Note that the present composition can also be cured using an electron beam, which is another aspect of the present invention. In this case, the photocuring reaction proceeds sufficiently for practical use even in the absence of component (C).

The present composition is useful as various types of impregnating agents, potting agents, sealing agents, and adhesives, and is particularly useful as optical fillers for forming a light-transmissive layer for various devices using an infrared LED, and particularly for displaying devices. The cured product is suitable as a light-transmissive layer for displaying devices using an infrared LED due to being less susceptible to coloration and becoming cloudy under high temperature or high temperature and humidity.

The present composition cures at a room temperature, and therefore can be suitably applied in coating a substrate with inferior heat resistance. The substrate is generally a transparent substrate such as glass, synthetic resin film, sheet, coating film, or the like. Furthermore, injection molding is an example of a coating method for the present composition, utilizing the low viscosity properties thereof.

Next, the cured product of the present invention will be described in detail.

The cured product obtained by curing the present composition has a high refractive index. The refractive index of the cured product is a value of 1.48 or higher at 25° C. and a wavelength of 847 nm. The refractive index of the cured product under this condition is within a range of 1.48 to 1.55, and preferably within a range of 1.48 to 1.54. This property allows the refractive index of a cured product obtained by curing the present composition to be sufficiently high to reduce interfacial reflection between optical glass and another light-transmissive layer in various devices using an infrared LED as a light source, thereby improving light extraction efficiency.

The cured product obtained by curing the present composition may have a relative dielectric constant of 2.70 or less in addition to the aforementioned property of having a high refractive index, and in particular, a photocurable liquid composition that provides a cured product with a dielectric constant of 2.60 or less can be preferably designed. In particular, a composition that provides a cured product having a dielectric constant of 2.20 to 2.70, preferably, 2.20 to 2.60 can by designed by optimizing the type and amount of component (A) and component (B).

The cured product of the present invention is obtained by curing the photocurable liquid composition by irradiating with light. While the shape of the cured product is not particularly limited, examples thereof include sheets, films, tapes, and lumps. Furthermore, integrating with various types of substrates is also possible.

The method of forming the cured product can be a method of applying the composition to a film shaped substrate, tape shaped substrate, or sheet shaped substrate, then curing by irradiating light forming a cured film containing the cured product on the surface of the substrate. Furthermore, it is possible to inject the present composition between two substrates, at least one of which is a transparent substrate, and then curing by irradiating with light from the transparent substrate side to obtain a cured product integrated with the substrate. The film thickness of the cured film is not limited, but is preferably 1 to 3000 µm, and more preferably 10 to 2000 µm.

A displaying device of the present invention is prepared using the photocurable liquid composition of the present invention. Examples thereof include LCDs (liquid crystal display), ECDs (electrochromic display), and other light receiving displaying devices, and ELDs (electroluminescent display) and other light emitting displaying devices. In the displaying device of the present invention, a space between a display part such as liquid crystal, organic EL, or the like and a display forming member such as a touch panel, cover lens, or the like, or between display forming members can be filled with the photocurable liquid composition of the present invention to reduce interfacial reflection and improve light extraction efficiency.

A typical manufacturing method for the displaying device of the present invention is an injection molding method, utilizing the low viscosity properties of the photocurable liquid composition. A specific example is a method of manufacturing a displaying device by injecting the present composition into a narrow gap between a substrate for an infrared LED light source and various transparent substrates, and then curing by irradiating with ultraviolet light.

On the other hand, the composition of the present invention can be designed to have a low dielectric constant of 2.70 or less, and preferably 2.60 or less for the cured product obtained therefrom, and therefore can be used as an insulating material with a high refractive index and high transparency. Specifically, the composition of the present invention is particularly useful as a material for forming an insulating layer for various articles, particularly electronic and electrical devices. The composition of the present invention can be applied on a substrate or sandwiched between two substrates, at least one of which includes a material that allows ultraviolet rays or electron beams to pass, and the composition can be cured by irradiating ultraviolet rays or electron beams to form an insulating layer. In this case, the composition of the present invention can be patterned when applied to a substrate, and then the composition can be cured. Alternatively, the composition can be applied to a substrate, and cured and uncured portions can be left during curing by ultraviolet rays or electron beam irradiation. Thereafter, an uncured portion can be removed with a solvent to form an insulating layer having a desired pattern.

The composition of the present invention is particularly suitable as a material for forming an insulating layer for touch panels and displays and other displaying devices. In this case, an arbitrary desired pattern may be formed as described above if necessary on the insulating layer. Therefore, a display device such as touch panel, display, or the like containing an insulating layer obtained by curing the UV curable organopolysiloxane composition of the present invention is also an aspect of the present invention.

Furthermore, the composition can also be used to form an insulating coating layer (insulating film) by curing after coating an article. Therefore, the composition of the present invention can be used as an insulating coating agent. Furthermore, a cured product formed by curing the curable composition of the present invention can be used as an insulating coating layer.

An insulating film formed from the photocurable liquid composition of the present invention can be used for various applications. In particular, use is possible as a component of an electronic device or as a material used in a process of manufacturing the electronic device. Electronic devices include semiconductor devices, magnetic recording heads, and other electronic apparatuses. For example, the curable composition of the present invention can be used in an insulating film of a semiconductor device, such as an LSI, system LSI, DRAM, SDRAM, RDRAM, D-RDRAM, or a multi-chip module multilayer circuit board, an interlayer insulating film for a semiconductor, an etch stopper film, a surface protection film, a buffer coat film, a passivation film in LSI, a cover coat for a flexible copper cladding plate, a solder resistant film, and a surface protection film for an optical device. In particular, the photocurable liquid composition of the present invention has a high refractive index, and thus is particularly preferable as an insulating layer in optical applications that require a high refractive index.

Furthermore, in addition to use as a coating agent, the photocurable liquid composition of the present invention is suitable for use as a potting agent, and particularly as an insulating potting agent for electronic devices and electrical devices.

The present invention is further described below based on Examples, but the present invention is not limited to the Examples below.

EXAMPLES

The photocurable liquid composition and cured product thereof of the present invention will be described below in further detail using examples. Furthermore, measurements and evaluations in the Examples and Comparative Examples were conducted as follows.

[Viscosity of Photocurable Liquid Composition]
The viscosity (mPa·s) at 25° C. was measured using a rotary viscometer (E type viscometer VISCONIC EMD produced by TOKIMEC CORPORATION).

[Chemical Structure of Component (A)]
The chemical structure of component (A) was identified by analysis using nuclear magnetic resonance spectroscopy.

[Appearance of Photocurable Liquid Composition and Cured Product]
The appearance of the photocurable liquid composition and cured product was visually observed and evaluated as described below.
A: Transparent
B: Slightly cloudy

[Transparency and Haze of Cured Product]
The photocurable liquid composition was filled between two glass sheets such that the thickness after curing was 200 μm (fill area: 40×40 mm$^2$), after which LED light with a wavelength of 405 nm was irradiated at an intensity of 50 mW/cm$^2$ for 40 seconds. The total light transmittance and haze of the cured sheet produced between two glass sheets were measured by a SH7000 haze meter manufactured by NIPPON DENSHOKU INDUSTRIES Co., Ltd. in accordance with a method specified in JIS K7361-1.

Hardness of Cured Product
The photocurable liquid composition was placed in a glass cup with a diameter of 25 mm and depth of 10 mm and was irradiated in a nitrogen atmosphere with a 405 nm LED light having an illuminance of 50 mW/cm$^2$ for 80 seconds. The hardness of the cured product produced was measured at room temperature on a Type D durometer in accordance with ASTM D 2240.

[Refractive Index of Photocurable Liquid Composition and Cured Product]
Using the curable composition and a cured product prepared for hardness measurement as described above, the refractive index at a wavelength of 847 nm was measured with a Metricon model 2010/M prism coupler at room temperature.

[Dielectric Constant of Cured Product]
A tin foil having a diameter of 33 mm and a thickness of 0.007 mm was pressed onto both surfaces of the prepared organopolysiloxane cured product. In order to improve close fitting properties between the cured product and the foil, a small amount of silicone oil, if necessary, was used for pressing. The capacitance at room temperature and 100 KHz was measured by an E4990A precision impedance analyzer manufactured by Keysight Technologies to which a parallel plate electrode having a diameter of 30 mm was connected. The dielectric constant was calculated using measured capacitance values, separately measured thicknesses of the cured product, and electrode area values.

Examples 1 to 7 and Comparative Example 1

Solvent-free photocurable liquid compositions were prepared using the following components. Note that components (C), (D), and (E) were pre-mixed to obtain a catalyst solution. The catalyst solution, component (A), and optionally component (B) were mixed at room temperature using a rotating and revolving mixer to obtain a photocurable liquid composition. The mixing ratios of the components, the physical properties of the composition, and the properties of the cured product are summarized in Table 1.

The following compounds were used as component (A).
(A1) 1-[2-(3,4-epoxycyclohexyl)ethyl]-3,3-diphenyl-5-phenethyl-1,1,5,5-tetramethyltrisiloxane
(A2) 1,5-bis[2-(3,4-epoxycyclohexyl)ethyl]-3,3-diphenyl-1,1,5,5-tetramethyltrisiloxane The following compounds were used as component (B).
(B1) 3-[2-(3,4-epoxycyclohexyl)ethyl]-1,1,1,3,5,5,5-heptamethyltrisiloxane
(B2): 1,3-bis[2-(3,4-epoxycyclohexyl)ethyl]-1,1,3,3-tetramethyldisiloxane The following compound was used as component (C1).
4-isopropyl-4'-methyldiphenyliodonium tetrakis(pentafluorophenyl)borate The following compound was used as component (E).
2-isopropylthioxanthone The following compound was used as component (D).
1,2-epoxy-4-vinylcyclohexane

TABLE 1

|  | Example 1 | Example 2 | Example 3 | Example 4 | Example 5 | Example 6 | Example 7 | Comparative Example 1 |
|---|---|---|---|---|---|---|---|---|
| (A1) | 98.32 | 83.17 | 73.27 |  | 73.70 | 73.77 |  |  |
| (A2) |  | 15.15 | 25.05 | 98.38 |  |  | 49.18 |  |
| (B1) |  |  |  |  | 24.61 | 24.59 | 49.18 |  |
| (B2) |  |  |  |  |  |  |  | 98.38 |
| (C1) | 0.50 | 0.50 | 0.50 | 0.49 | 0.51 | 0.50 | 0.50 | 0.49 |
| (E) | 0.04 | 0.04 | 0.04 | 0.04 | 0.04 | 0.04 | 0.04 | 0.04 |
| (D) | 1.14 | 1.14 | 1.14 | 1.10 | 1.14 | 1.10 | 1.10 | 1.10 |
| Total | 100.00 | 100.00 | 100.00 | 100.00 | 100.00 | 100.00 | 100.00 | 100.00 |
| Appearance of curable composition | A | A | A | A | A | A | A | A |
| Viscosity of curable composition | 182 | 194 | 203 | 276 | 72 | 59 | 27 | 34 |
| Refractive index of curable composition | 1.52 | 1.52 | 1.52 | 1.51 | 1.49 | 1.49 | 1.46 | 1.47 |
| Appearance of cured product | A | A | A | A | A | A | A | A |
| Refractive index of cured product | 1.53 | 1.53 | 1.53 | 1.53 | 1.51 | 1.51 | 1.48 | 1.48 |
| Transmittance of cured product | 99.0 | 99.0 | 99.0 | 99.0 | 99.0 | 99.0 | 99.0 | 99.0 |
| Haze of cured product | <0.1 | <0.1 | <0.1 | <0.1 | <0.1 | <0.1 | <0.1 | <0.1 |

TABLE 1-continued

| | Example 1 | Example 2 | Example 3 | Example 4 | Example 5 | Example 6 | Example 7 | Comparative Example 1 |
|---|---|---|---|---|---|---|---|---|
| Hardness of cured product | 23 | 37 | 45 | 83 | 79 | 37 | 66 | 74 |
| Dielectric constant of cured product | | | | | | 2.7 | 2.55 | 3.0 |

The results of Examples 1 to 7 show that the photocurable liquid silicone composition of the present invention has low viscosity and favorable transparency. The transparency of the cured product obtained after curing was also confirmed to be high, and the refractive index, particularly in the infrared region, was also confirmed to be high. In particular, as in Examples 6 and 7, it was possible to design solvent-free photocurable liquid compositions that could combine high refractive index and low dielectric constant in a cured product. On the other hand, the results of Comparative Example 1 confirm that the refractive index of the cured product obtained by photocuring of a photocurable liquid composition containing a siloxane that does not contain a monovalent functional group selected from aromatic groups with 6 to 12 carbon atoms and aralkyl groups with 7 to 12 carbon atoms was only 1.48. Furthermore, a cured product with a low dielectric constant could not be obtained.

INDUSTRIAL APPLICABILITY

The photocurable liquid composition of the present invention has low viscosity at room temperature and is suitable for injection molding. Furthermore, the composition quickly cures based on irradiation with long wavelength light, for example, visible light with a wavelength of 405 nm or ultraviolet light, thereby contributing to improved productivity. Furthermore, a resulting cured product has excellent transparency and a high refractive index, particularly in the infrared region (1.50 or higher), making it useful as a material for devices using an infrared LED light source. Furthermore, the photocurable liquid composition of the present invention can be designed to provide a cured product having a low dielectric constant if necessary, and can also be preferably used in insulating layers/insulating coating layers where optical properties are required.

The invention claimed is:

1. A solvent-free photocurable liquid composition, comprising:
   (A) one or more type of an organosilane or organopolysiloxane having on average one or more epoxy group-containing photoreactive functional groups and two or more monovalent functional groups selected from aromatic groups with 6 to 12 carbon atoms and aralkyl groups with 7 to 12 carbon atoms in a molecule and having 1 to 5 silicon atoms;
   (C1) a photocationic polymerization initiator;
   (D) a silicon-free photocurable compound expressed by the formula: $R^X$-R where $R^X$ represents a photoreactive functional group, and R represents a monovalent functional group selected from unsubstituted or fluorine-substituted monovalent alkyl groups, alkenyl groups with 2 to 6 carbon atoms, aromatic groups with 6 to 12 carbon atoms, aralkyl groups with 7 to 12 carbon atoms, hydroxyl groups, and alkoxy groups; and
   (E) a photosensitizer;
   wherein the viscosity of the entire liquid composition, measured at 25°° C. using an E-type viscometer, is 500 mPa·s or less; and
   wherein an organic solvent is not included in the composition.

2. A solvent-free photocurable liquid composition, comprising:
   (A) one or more type of an organosilane or organopolysiloxane having on average one or more cationic polymerizable photoreactive functional groups and two or more monovalent functional groups selected from aromatic groups with 6 to 12 carbon atoms and aralkyl groups with 7 to 12 carbon atoms in a molecule and having 1 to 5 silicon atoms; and
   (E) a photosensitizer;
   wherein the viscosity of the entire liquid composition, measured at 25° C. using an E-type viscometer, is 500 mPa·s or less; and
   wherein an organic solvent is not included in the composition.

3. The solvent-free photocurable liquid composition according to claim 2, further comprising (C) one or more type of a curing catalyst.

4. The solvent-free photocurable liquid composition according to claim 1, wherein a photocuring reaction provides a cured product having a refractive index, at 25° C. and a wavelength of 847 nm, of 1.48 or higher.

5. The solvent-free photocurable liquid composition according to claim 2, wherein component (A) has on average one or more epoxy group-containing photoreactive functional groups.

6. The solvent-free photocurable liquid composition according to claim 2, wherein component (C) is selected from (C1) photocationic polymerization initiators and (C2) photoradical polymerization initiators.

7. The solvent-free photocurable liquid composition according to claim 1, wherein component (A) is an organopolysiloxane having 2 to 5 silicon atoms, expressed by the average composition formula (1):

$$R^X_a R^Y_b R^Z_c SiO_{(4-a-b-c)/2} \qquad (1)$$

where $R^X$ represents an epoxy group-containing photoreactive functional group, $R^Y$ represents a monovalent functional group selected from aromatic groups with 6 to 12 carbon atoms and aralkyl groups with 7 to 12 carbon atoms, and $R^Z$ represents a group selected from unsubstituted or fluorine-substituted monovalent hydrocarbon groups, hydroxyl groups, and alkoxy groups, excluding the photoreactive functional groups and monovalent functional groups selected from aromatic groups with 6 to 12 carbon atoms and aralkyl groups with 7 to 12 carbon atoms, and where a, b, and c are numbers that satisfy the following conditions: $1 \leq (a+b+c) \leq 3$ and $0.08 \leq (a/(a+b+c)) \leq 0.5$, and one or more $R^X$ and at least two $R^Y_s$ are provided in a molecule.

8. The solvent-free photocurable liquid composition according to claim 1, wherein component (A) is an organopolysiloxane selected from the group consisting of:
(A1) a chain organopolysiloxane expressed by the following formula (2):

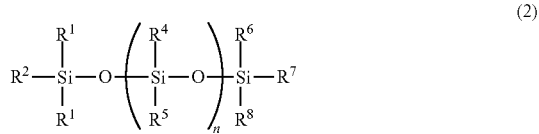

(2)

where on average one or more group per one molecule of all $R^1$ to $R^8$ groups is an epoxy group-containing photoreactive functional group, and at least two are monovalent functional groups selected from aromatic groups with 6 to 12 carbon atoms and aralkyl groups with 7 to 12 carbon atoms; the other $R^1$ to $R^8$ each independently represent an unsubstituted or fluorine-substituted monovalent hydrocarbon group; and n is a number from 0 to 3;
(A2) a cyclic organopolysiloxane expressed by the following formula (3):

(3)

where $R^9$ and $R^{10}$ each independently represent a group selected from photoreactive functional groups, monovalent functional groups selected from aromatic groups with 6 to 12 carbon atoms and aralkyl groups with 7 to 12 carbon atoms, and unsubstituted or fluorine-substituted monovalent hydrocarbon groups, of all $R^9$ and $R^{10}$, an average of one or more group is an epoxy group-containing photoreactive functional group and at least two are monovalent functional groups selected from aromatic groups with 6 to 12 carbon atoms and aralkyl groups with 7 to 12 carbon atoms, and k is a number from 3 to 5; and
mixtures of these organopolysiloxanes.

9. The photocurable liquid composition according to claim 1, wherein the number of epoxy group-containing photoreactive functional groups in component (A) is on average one or higher and two or lower per one molecule.

10. The solvent-free photocurable liquid composition according to claim 1, further comprising (B) one or more type of organopolysiloxane having on average one or more photoreactive functional group in a molecule and having 2 to 10 silicon atoms, excluding the organopolysiloxane corresponding to component (A).

11. The solvent-free photocurable liquid composition according to claim 10, wherein component (B) is one or more type selected from:
(B1) one or more type of an organopolysiloxane having on average one or more photoreactive functional groups in a molecule, in which the included number of monovalent functional groups selected from aromatic groups with 6 to 12 carbon atoms and aralkyl groups with 7 to 12 carbon atoms is less than two, and having 2 to 5 silicon atom atoms; and
(B2) one or more type of organopolysiloxane having on average one or more photoreactive functional groups in a molecule and having over 5 and 10 or less silicon atoms.

12. The solvent-free photocurable liquid composition according to claim 2, further comprising (D) a silicon-free photocurable compound expressed by the formula: $R^X$–R where $R^X$ represents a photoreactive functional group, and R represents a monovalent functional group selected from unsubstituted or fluorine-substituted monovalent alkyl groups, alkenyl groups with 2 to 6 carbon atoms, aromatic groups with 6 to 12 carbon atoms, aralkyl groups with 7 to 12 carbon atoms, hydroxyl groups, and alkoxy groups.

13. The solvent-free photocurable liquid composition according to claim 1, wherein the refractive index, at 25° C. and a wavelength of 847 nm, of the entire liquid composition prior to curing is 1.47 or more, and the viscosity of the entire liquid composition, measured at 25° C. using an E-type viscometer, is 250 mPa·s or less.

14. The solvent-free photocurable liquid composition according to claim 10, wherein the mass ratio of component (A) and component (B) is 80:20 to 20:80, and photocuring provides a cured product having a dielectric constant of 2.70 or less.

15. A cured product obtained by curing the solvent-free photocurable liquid composition according to claim 1 by irradiating with light.

16. An optical filler, comprising the solvent-free photocurable liquid composition according to claim 1.

17. A displaying device, comprising a layer containing a cured product of the solvent-free photocurable liquid composition according to claim 1.

18. A method of manufacturing a displaying device, the method comprising:
injecting the solvent-free photocurable liquid composition according to claim 1 between a substrate for a light source and a transparent substrate; and
curing the photocurable liquid composition after injection by irradiating with a high energy beam.

19. A solvent-free photocurable liquid composition, comprising:
(A) one or more type of an organosilane or organopolysiloxane having on average one or more photoreactive functional groups and two or more monovalent functional groups selected from aromatic groups with 6 to 12 carbon atoms and aralkyl groups with 7 to 12 carbon atoms in a molecule and having 1 to 5 silicon atoms;
(C2) a photoradical polymerization initiator; and
(E) a photosensitizer;
wherein the viscosity of the entire liquid composition, measured at 25°° C. using an E-type viscometer, is 500 mPa·s or less; and
wherein an organic solvent is not included in the composition.

20. The solvent-free photocurable liquid composition according to claim 19, further comprising (D) a silicon-free photocurable compound expressed by the formula: $R^X$–R where $R^X$ represents a photoreactive functional group, and R represents a monovalent functional group selected from unsubstituted or fluorine-substituted monovalent alkyl groups, alkenyl groups with 2 to 6 carbon atoms, aromatic groups with 6 to 12 carbon atoms, aralkyl groups with 7 to 12 carbon atoms, hydroxyl groups, and alkoxy groups.

* * * * *